Aug. 1, 1950      D. G. JACKSON      2,517,491
ADJUSTABLE THREAD GAUGE
Filed July 1, 1946
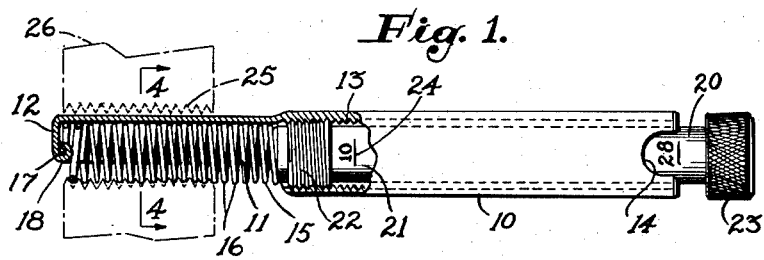
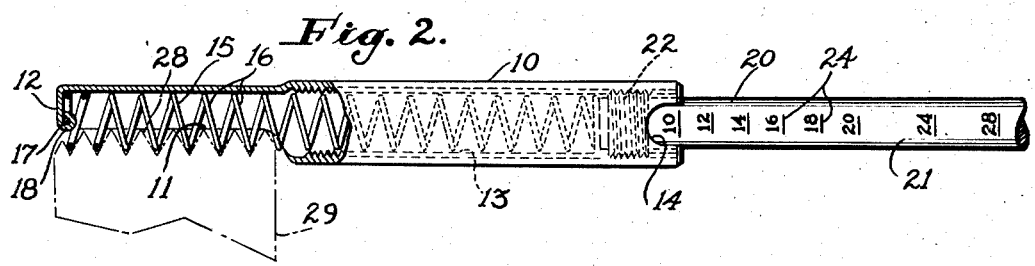
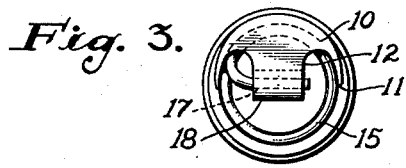 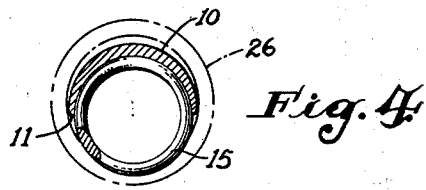
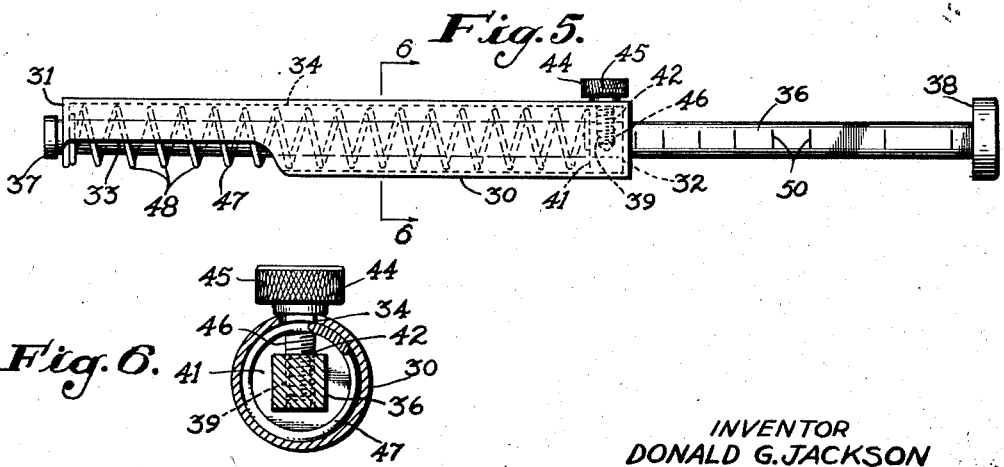
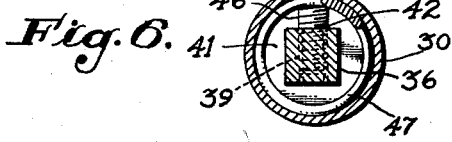
INVENTOR
DONALD G. JACKSON
BY
HARRIS, KIECH, FOSTER & HARRIS
FOR THE FIRM
ATTORNEYS Patented Aug. 1, 1950

2,517,491

UNITED STATES PATENT OFFICE 2,517,491

ADJUSTABLE THREAD GAUGE

Donald G. Jackson, Pasadena, Calif.

Application July 1, 1946, Serial No. 680,759

2 Claims. (Cl. 33—199)

My invention relates to gauges and measuring devices and particularly to a gauge for indicating the pitch or number of screw threads per unit of length on screw-threaded objects.

During the manufacture of screw-threaded tools and other articles and during the assembly of various mechanical parts it is necessary to determine or check the lead or pitch of the screw threads so that the parts may be duplicated and so that mating screw-threaded elements will fit properly when screwed together. It is also desirable that the pitch of the screw threads of bolts, screws, studs, nuts and other fastening devices be determined in order to aid in segregating devices of similar types and sizes in machine shops, tool cribs, stock rooms and other places.

Various gauging and measuring devices have been used for the purpose of determining the pitch or lead of screw threads, the most commonly used type of gauge consisting of a series of leaves pivoted together to fold into a holder and each leaf having a series of substantially V-shaped projections or teeth which correspond to the profile of a screw thread of a particular form and size. Since screw threads are made in a large variety of pitches, it is necessary to provide an equally large number of such leaves, each marked to designate the number of threads per unit of length. While such gauges are admittedly accurate and reliable in checking screw threads, their operation involves a trial-and-error principle and thus considerable time is required to check the screw threads. That is to say, when a screw thread is to be gauged, it is the usual practice to place the teeth of one of the leaves against the screw thread in an effort to align the teeth with the grooves of the screw threads. If the teeth of this gauge do not match the screw thread, another gauge leaf is tried and so on until a gauge is located which has teeth corresponding to the pitch of the screw thread. This procedure is not only laborious but consumes considerable time and since no means are provided for retaining a gauge leaf in its extended position, it often happens that a leaf is unintentionally moved to retracted position and must be again found when a series of identical screw threads are to be compared.

It is a particular object of my invention to provide a thread gauge of an adjustable type adapted to gauge or check a large variety of screw threads which have various pitches or number of threads per unit of length.

Another object is to provide a gauge employing a single gauging element in the form of a resilient helical member adapted to be placed against the screw threads of an object with a portion of its helices engaging in the grooves of the screw threads to test the pitch thereof, said gauge also including means for varying the pitch of the helices whereby to adapt the gauge for use in measuring or determining the pitch of various screw threads.

Another object is to provide a gauge of the type referred to comprising a tubular body member having a longitudinal opening, a resilient helical member disposed in the body member with a portion of its helices projecting outwardly through the opening to adapt them to be positioned in the grooves of a screw thread, an adjusting member movable in the body member and engageable with the helical member to change the length thereof to vary the pitch of its helices, and means for indicating the pitch or number of helices per unit of length so that after the helices have been adjusted in accordance with the pitch of the screw thread being gauged the exact pitch may be readily determined.

Another object is to provide a gauge of the type indicated which may be quickly and conveniently adjusted through a large range of pitches and, having been adjusted to a particular pitch, will maintain its adjustment so that it may be used indefinitely to compare screw threads without getting out of adjustment.

Another object is to provide a gauge of the character referred to which is adapted for use in gauging both external and internal screw threads.

Another object is to provide a gauge of the type specified which is extremely simple in construction being composed of a minimum number of parts adapted for economical manufacture, and one which is easy to operate and highly efficient in performing its intended function.

Further objects of my invention will appear from the following specification and the drawing, which is intended for the purpose of illustration only, and in which:

Fig. 1 is a part-sectional side elevational view of a preferred construction of my improved thread gauge, the parts being shown as adjusted for gauging screw threads of relatively small pitch;

Fig. 2 is a view similar to Fig. 1 showing the parts adjusted for gauging screw threads of relatively large pitch;

Fig. 3 is an end view of the gauge;

Fig. 4 is a cross-sectional view taken on line 4—4 of Fig. 1;

Fig. 5 is a side view of a thread gauge of modified construction; and

Fig. 6 is a cross-sectional view taken on line 6—6 of Fig. 5.

Referring first to Figs. 1 to 4, inclusive, my improved thread gauge comprises a body member 10 in the form of a tubular handle. The circular wall of the member 10 is cut away adjacent its forward end to form a longitudinal opening 11 and at this end the member is provided with an end wall 12. The body member 10 is screw threaded internally throughout the greater portion of its length as indicated at 13. At the end of the member 10 opposite to the end wall 12 a slight opening 14 may be provided for a purpose to be explained hereinafter.

A gauging member 15 is disposed within the body member 10 and consists of a helical spring of the compression type having its individual helices 16 normally widely spaced as shown in Fig. 2. One end of the wire comprising the helical member 15 is bent laterally in a straight portion 17 and this portion is secured to the end wall 12 of the body member 10 by looping the lower end of the wall therearound as indicated at 18 in Figs. 1 to 3. It is to be noted that a portion of the helices 16 at the forward end of the member 15 project outwardly through the longitudinal opening 11 of the body member 10 to adapt them to enter the thread grooves of a screw-threaded object. While the helical member 15 is herein illustrated as of circular shape in end view (Figs. 3 and 4), it is within the concept of my invention to provide a helical member of rectangular, elliptical, polygonal or irregular contour in end view and to provide a tubular body member of a cross section adapted to enclose such elements. The wire from which the resilient gauging element 15 is constructed may be of any suitable cross-section, such as triangular, to provide a V-shaped apex or point adapted to seat in the thread grooves being gauged, the present drawings illustrating the wire as of circular cross section by way of example only.

The helical gauging member 15 may be substantially rigid, that is, non-expansible or contractible with its helices of fixed pitch or spacing to adapt them to be used only in gauging a screw thread of particular size or pitch but preferably the member 15 is constructed from resilient wire to adapt it to be contracted and expanded within the body member 10 to vary the pitch or spacing of its helices or spirals 16 whereby to adapt the gauging member for use in gauging screw threads of various pitches. While various means may be provided for changing the pitch or spacing of the helices 16 I prefer to employ an adjusting member 20 for this purpose. The adjusting member 20 consists of an elongated stem 21 having a screw-threaded portion 22 at one end adapted to be screwed into the body member 10. At the opposite or outer end of the adjusting member 20 is a knurled head 23 adapted to be rotated by the fingers of the operator. Graduations 24 are stamped or otherwise formed on the stem 21 and these graduations are marked to indicate the pitch or number of helices per unit of length. The graduations 24 preferably cover a range of pitches corresponding to screw threads having from 10 to 28 threads per inch but other values such as those employed in the metric system may be used. The graduations 24 are adapted to register with the end of the body member 10 to indicate the spacing of the helices and the sight opening 14 facilitates the reading of the numerical values.

When it is required to determine the pitch of the internal screw threads 25 of an object 26 such as indicated by dotted lines in Fig. 1, the working end of the thread gauge is inserted into the threaded hole and the head 23 rotated in a direction to cause the stem 16 to be screwed into the body member 10 to contract the resilient helical member 15 to move the helices 16 more closely together or in the opposite direction to permit the helical member to expand in length to space the helices farther apart. This procedure is followed until the projecting portions of the helices 16 match exactly with and engage in the grooves of the screw threads 25. It will be apparent that when the helices 16 engage exactly in the thread grooves, the pitch or spacing of the helices must correspond to the pitch of the screw thread. It therefore follows, that the pitch value of the helices, as indicated by the particular graduation 24 registering with the end of the body member, will correspond to the pitch of the screw thread. For example, if the indicated reading is "28" as shown in Fig. 1, then the spacing of the helices 16 is twenty-eight per unit of length (for example, one inch) and the number of screw threads per unit of length is also twenty-eight. If the adjusting member 20 is screwed outwardly as shown in Fig. 2 to permit the helical member to expand in length to register the helices 16 with the thread grooves and the indicated reading is "10," this signifies that the helices and screw threads have a pitch of ten. In Fig. 2 the gauge is shown as applied to use in determining the pitch of a screw thread 28 formed on the exterior of an object 29 which is indicated by dotted lines. Thus, it is seen that the gauge is adapted to indicate the pitch of either external or internal screw threads.

The modified thread gauge shown in Figs. 5 and 6 utilizes substantially the same principle as the device shown in Figs. 1 to 4 and comprises a tubular body member 30 having end walls 31 and 32. The body member 30 has a longitudinal opening 33 and a longitudinal slot 34. An adjusting member 36, preferably constructed from a rod of square cross section, is slidable through suitable apertures in the end walls 31 and 32 and is provided with a stop flange 37 at one end and with a head 38 at its opposite end. The adjusting member 36 is also provided with a threaded hole 39.

A collar 41 is mounted on the adjusting member 36 within the body member 30 and has a hole 42 in its side. A clamping screw 44 has a knurled head 45 and a threaded shank 46 which is adapted to be inserted through the longitudinal slot 34 of the body member 30, through the hole 42 in the collar 41 and screwed into the threaded hole 39 in the adjusting member 36. A resilient helical member 47 surrounds the adjusting member 36 between the end wall 31 of the body member 30 and the collar 41 and portions of its helices 48 project outwardly through the opening 33. By moving the adjusting member 36 longitudinally in the body member 30, the helical member 47 may be contracted and expanded in length to vary the spacing or pitch of its helices for the purpose previously set forth in connection with the gauge shown in Figs. 1 to 4. After the helical member 47 has been adjusted, the clamping screw 44 may be tightened to clamp the collar 41 firmly against the interior of the body member 30 to retain the parts in their position of adjustment. The adjusting member 36 may have a series of graduations 50 which register with the end of the body member 30 to indicate the pitch of the helices 48 and thereby the pitch of the screw threads being gauged.

It will be observed from the foregoing that my invention provides a simple, yet highly efficient gauge adapted particularly for determining the pitch of screw threads. It is to be noted that the improved gauge is adapted for use in gauging both internal and external threads. As an important feature of improvement, a single member is employed as the thread engaging means and the characteristics of this member may be readily changed to adapt it to gauge screw threads of various pitch. Thus, the gauge is more universal in use and constitutes an important improvement over previous types of thread gauges wherein a series of different thread engaging elements are employed. The present gauge may be employed either as a means for determining the pitch of screw threads and, since the adjustment of its parts is maintained, it may be used for comparing and segregating various objects having identical screw threads.

It will be apparent that it is within the purview of my invention to provide a thread gauge of simplified construction in which the body member 30 is dispensed with and a helical tension spring is employed. The tension spring may have one of its ends secured to the flange 37 of the adjusting member 36 and its other end fastened to the collar 41 which in turn is slidable on the member 36. In this form of device, the collar 41 is simply moved along the member 36 to expand and contract the length of the tension spring and thereby vary the spacing or pitch of its helices, the collar registering with the graduations 50 to indicate the pitch of the helices and the screw threads being gauged.

While the improved thread gauge has been herein shown and described as embodied in several preferred forms of construction, by way of example, it is to be understood that other changes may be made in its construction and in the manner of applying it to use without departing from the spirit of the invention and I therefore reserve the right to all such changes as properly come within the scope of the appended claims.

I claim as my invention:

1. A thread gauge for determining the number of screw threads per unit of length on an object, comprising: a tubular body member having a longitudinal opening in its side and provided with internal screw threads; a resilient helical member disposed in said body member with a portion of its helices projecting outwardly through said opening; an adjusting member in said body member having screw threads engageable with the screw threads of said body member to adapt the adjusting member to be moved longitudinally in said body member upon relative rotation between said members, said adjusting member being engageable with said helical member and adapted to contract the length of said helical member when moved in one direction and to permit expansion in the length of said helical member when moved in the opposite direction to vary the lead of said helices and thereby vary the number of helices per unit of length, said projecting portion of said helices being adapted to be placed against the screw-threaded portion of the object being gauged and adapted to register with and engage in the thread grooves of said object when the number of helices per unit of length corresponds to the number of thread grooves per unit of length; and cooperating means on said adjusting member and said body member for indicating the number of helices per unit of length.

2. A thread gauge for determining the number of screw threads per unit of length on an object, comprising: a tubular body member having an end wall and a longitudinal opening in its side and provided with internal screw threads; a resilient helical member disposed in said body member with one of its ends engaging said end wall and with a portion of its helices projecting outwardly through said opening; a screw-threaded adjusting member screwed into said body member and engaging the other end of said helical member and adapted to be screwed in one direction to contract the length of said helical member and in the opposite direction to permit expansion of said helical member to vary the lead of said helices and thereby the member of helices per unit of length, said projecting portion of said helices being adapted to be placed against the screw-threaded portions of the object being gauged and adapted to register with and engage in the thread grooves of said object when the number of helices per unit of length corresponds to the number of thread grooves per unit of length; and graduations on said adjusting member registerable with the end of said body member for indicating the number of helices per unit of length.

DONALD G. JACKSON.

REFERENCES CITED

The following references are of record in the file of this patent:

UNITED STATES PATENTS

| Number | Name | Date |
|---|---|---|
| 1,543,244 | Blood | June 23, 1925 |
| 1,588,362 | Hanson | June 8, 1926 |
| 1,706,513 | Baines et al. | Mar. 26, 1929 |
| 1,875,726 | Hartness | Sept. 6, 1932 |

FOREIGN PATENTS

| Number | Country | Date |
|---|---|---|
| 257,498 | Germany | Mar. 8, 1913 |

Certificate of Correction

Patent No. 2,517,491 August 1, 1950

DONALD G. JACKSON

It is hereby certified that error appears in the printed specification of the above numbered patent requiring correction as follows:

Column 6, line 35, for the word "member" read *number*;

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*